3,576,842
METHOD OF PURIFYING DIMETHYL-TEREPHTHALATE

Tuneo Kimura, Yasuo Tanabe, Takatoshi Ogawa, and Jun Toriya, Kitakyushu-shi, Japan, assignors to Mitsubishi Chemical Industries Limited
No Drawing. Continuation-in-part of application Ser. No. 658,059, Aug. 3, 1967. This application Aug. 6, 1969, Ser. No. 848,115
Claims priority, application Japan, Aug. 26, 1966, 41/55,813
Int. Cl. C07c 69/82
U.S. Cl. 260—475      17 Claims

ABSTRACT OF THE DISCLOSURE

A process for the purification of crude dimethyl terephthalate derived from p-xylene. The crude dimethyl terephthalate is contacted with molecular oxygen in the presence of a cobalt-comprising material, a bromine-comprising material, and if desired, a manganese-comprising material. Both the cobalt-comprising material and the bromine-comprising material are soluble in the crude dimethyl terephthalate.

---

This application is a continuation-in-part of copending application Ser. No. 658,059, filed Aug. 3, 1967, now abandoned.

This invention relates to a process for the purification of dimethyl terephthalates. More particularly it relates to a process for the purification of crude dimethyl terephthalates derived from p-xylene.

Dimethyl terephthalate produced by oxidation of p-xylene generally contains various impurities. If this dimethyl terephthalate is used as a raw material in the manufacture of synthetic textile fibers, a number of problems arise. When heated the impurities are converted to colored materials thereby lowering the quality of the fibers.

Various methods have been proposed for removal of these impurities; however, none of these methods have proven to be satisfactory.

An object of this invention is to provide a simple and effective process for the purification of dimethyl terephthalates.

Another object of the invention is to provide an economical process for the purification of dimethyl terephthalates.

A further object of the invention is to provide an effective process for the purification of dimethyl terephthalate derived from p-xylene.

In accordance with the invention, these objects are readily accomplished by contacting a crude dimethyl terephthalate, derived from p-xylene, with molecular oxygen in the presence of a "cobalt-comprising material," a "bromine-comprising material" and if necessary a "manganese-comprising material." Said materials being soluble in the "crude" dimethyl terephthalate.

It should be understood that the terms "cobalt-comprising material," "bromine-comprising material" and "manganese-comprising material" as used in this specification, respectively imply any substances which dissolve in the crude dimethyl terephthalate and which contain one or more available cobalt, bromine, or manganese-atoms. These substances include those cobalt, bromine, or manganese-salts which remain as employed either in the terephthalic acid esterification or in the dimethyl terephthalate purification steps. These substances also include metallic cobalt, metallic manganese, and oxides thereof, which when employed as catalysts in the terephthalic acid esterification step convert to a compound or a mixture which is soluble in the crude dimethyl terephthalate produced by the esterification; the metallic cobalt, metallic manganese, and oxides thereof being normally insoluble in said crude dimethyl terephthalate.

The above-mentioned "cobalt-comprising material" includes metallic cobalt, cobalt oxide, cobalt acetate, cobalt benzoate, cobalt toluate, cobalt terephthalate, cobalt oxalate, cobalt carbonate, basic cobalt carbonate, cobalt chloride, and cobalt bromide. These materials when dissolved in a suitable solvent and employed in the esterification step form one or more compounds which remain dissolved in the crude dimethyl terephthalate. "Cobalt-comprising material" also includes cobalt acetate, cobalt benzoate, cobalt toluate, cobalt carbonate, basic cobalt carbonate, cobalt chloride and cobalt bromide which when employed in the purification step remain dissolved in the crude dimethyl terephthalate. The amount of "cobalt-comprising material" required for processing a crude dimethyl terephthalate is generally 0.002 to 1.0% by weight, preferably 0.003 to 0.5% by weight, calculated as metallic cobalt.

The above-mentioned "bromine-comprising material" includes sodium bromide, potassium bromide, ammonium bromide, sodium bromate, tetrabromethane, methyl bromide, benzene hexabromide, manganese bromide, and bromoform which when employed in the step of esterification or purification remain dissolved as one or more compounds in the crude dimethyl terephthalate. The amount of "bromine-comprising material" required for processing a crude dimethyl terephthalate is generally 0.001 to 1.0% by weight, preferably 0.003 to 0.3% by weight calculated as bromine.

The above-mentioned "manganese-comprising material" includes metallic manganese, manganese dioxide, manganese bromide, manganese chloride, manganese carbonate, manganese nitrate, manganese acetate, manganese oxalate, manganese benzoate, and manganese-2-ethylhexanoate. These materials when dissolved in a suitable solvent and employed in the esterification step form one or more compounds which remain dissolved in the crude dimethyl terephthalate. "Manganese-comprising material" also includes manganese bromide, manganese chloride, manganese carbonate, manganese acetate, manganese oxalate, manganese benzoate, and manganese-2-ethylhexanoate which when dissolved in a suitable solvent and employed in the purification step form one or more compounds which remain dissolved in the crude dimethyl terephthalate. The amount of "manganese-comprising material" required for processing a crude dimethyl terephthalate is 0.001 to 1.0% by weight, preferably 0.003 to 0.5% by weight calculated as metallic manganese.

While the process of the invention may successfully be carried out in the presence of any "cobalt-comprising material" or "bromine-comprising material," a more favorable result is obtained when a "manganese-comprising mateiral" is added to the reaction system. The "manganese-comprising material" serves to prolong the life of the catalyst.

A compound which contains both the cobalt atom and the bromine atom, as for example cobalt bromide, is preferred. This is because the compound exerts both the function of a "cobalt-comprising material" and the function of a "bromine-comprising material." Likewise, manganese bromide simultaneously exerts both the function of the manganese atom and that of the bromine atom.

The process of the invention is performed by passing oxygen or gases containing oxygen through dimethyl terephthalate, usually while it is in the molten state, in the presence of any "cobalt-comprising material," "bromine-comprising material," and if necessary "manganese-comprising material." The temperature employed for the reaction may exceed the melting point of crude dimethyl terephthalate. However, the employment of too high a temperature results in the decomposition of dimethyl terephthalate or in the elevation of the vapor pressure of dimethyl terephthalate. Increased vapor pressure leads to sublimation of dimethyl terephthalate and makes the recovery of dimethyl terephthalate difficult. Accordingly, the reaction is carried out at a temperature of 140° C. to 280° C., and preferably 140° C. to 230° C.

According to the invention the oxidation product of p-xylene is esterified with the aid of one or more materials selected from the group consisting of metallic cobalt, cobalt oxides, and cobalt salts.

Upon completion of the esterification, the formed water and excess methanol are removed. No further addition of cobalt is required as the resulting crude dimethyl terephthalate already contains dissolved therein as the "cobalt-comprising material" the metallic cobalt, cobalt oxides, cobalt salts or combinations thereof which were employed in the esterification reaction. Bromine salts and if needed manganese salts, are then added to the crude dimethyl terephthalate. The crude dimethyl terephthalate is then brought into contact with molecular oxygen.

Further, in the course of the esterification of the oxidation product of p-xylene either metallic manganese, manganese oxides, manganses salts or mixtures thereof may be added as follows:

Upon completion of the esterification, the formed water and the excess methanol are removed. The cobalt salt or bromine salt is added to the resultant crude dimethyl terephthalate which is then contacted with molecular oxygen. The further addition of manganese-salt is unnecessary as the crude dimethyl terephthalate already contains dissolved therein metallic manganese, manganese oxide, and manganese salt or mixtures thereof which were employed in the course of the esterification. Naturally, if a cobalt-salt and manganese-salt was employed as the esterification catalyst, the addition during the purification step of the bromine salt alone is sufficient.

In accordance with the process of the invention, impurities as for example p-formyl benzoic acid methyl ester, contained within the crude dimethyl terephthalate are effectively removed. p-Formyl benzoic acid methyl ester is one of the primary causes of dimethyl terephthalate coloration. In the processes of the prior art, the removal of this ester from the crude dimethyl terephthalate has proven to be a very difficult task. In contrast, p-formyl benzoic acid methyl ester is readily removed in accordance with the invention. This may be attributed to the fact that the p-formyl benzoic acid methyl ester having a boiling point approximating dimethyl terephthalate, is converted in the aforesaid process to a compound which has a boiling point considerably different from dimethyl terephthalate. The compound thus formed is readily removed by distillation.

Thus, in accordance with the present invention a heat stable dimethyl terephthalate can be relatively quickly obtained by means of an apparatus, which is simple in construction and easy to operate.

In addition, the "cobalt-comprising material," "bromine-comprising material" and "manganese-comprising material" employed in the process of the invention may be recovered after the distillation and reused.

EXAMPLE 1

Terephthalic acid produced by the oxidation of p-xylene, cobalt acetate, and methyl alcohol were fed to a raw material adjusting basin at the rate of 40 kg./hr., 55.3 g./hr., and 78 kg./hr., respectively, and admixed. The resulting slurry was then introduced into an esterification tank. Esterification was effected at the rate 118 kg./hr. under 150 atm. and at 290° C. The formed water and unreacted methyl alcohol were separated from the slurry and deaired, under normal pressure, at 240° C. The esterification catalyst, stripped of lower boiling point substances, and the crude dimethyl terephthalate, containing 0.10 wt. percent of by-product impurities consisting chiefly of p-formyl benzoic acid methyl ester, were introduced at the rate 44.5 kg./hr. into an oxidizing purification tank. A suspension liquor was prepared by heating and mixing a catalyst mixture of 3.2 kg. of NaBr, and 1.8 kg. of $Mn(AcO)_2$ and 95 kg. of dimethyl terephthalate under atmospheric conditions. The suspension liquor was continuously fed to the oxidizing purification tank at the rate 0.5 kg./hr. The temperature inside the oxidizing purification tank was maintained at 200° C. The mixture was continuously stirred. Nitrogen containing 5 vol. percent of oxygen was blown into the tank and into contact with the slurry at the rate 0.175 $Nm.^3$/hr., and was then discharged from the tank as waste gas.

The reaction product was successively transferred to two distillation columns. One column was for lower boiling point materials. The other column was for higher boiling point materials. A purified dimethyl terephthalate was produced at the rate of 34.9 kg./hr. This purified dimethyl terephthalate contained less than 0.002% p-formyl benzoic acid methyl ester. A heat stability test of said purified dimethyl terephthalate was conducted. The purified dimethyl terephthalate when heated for 4 hours at 175° C. showed 10 APHA color in the molten state, based on the standard stipulated by the American Public Health Association.

Similar results were obtained when 3.7 kg. of KBr were employed in the aforesaid oxidizing purification instead of 3.2 kg. of NaBr.

EXAMPLE 2

The process of Example 1 was followed for the esterification. However, no cobalt acetate was employed.

The resultant crude dimethyl terephthalate, contained 0.08 wt. percent of p-formyl benzoic acid methyl ester. 400 g. of said crude dimethyl terephthalate were placed in a glass flask and melted in an oil bath at 200° C., over a period of 30 minutes. The resultant product was poured into a reaction column having a 47 mm. diameter and a 500 mm. height. 0.4 g. of cobalt acetate and 0.27 g. of potassium bromide were added to said column. Oxidizing gases composed of 95 mol percent of nitrogen and 5 mol percent of oxygen were blown into the bottom of the column at the rate 120-liter NTP/hr. This treatment, was carried out for 60 minutes at 200° C.

During the treatment the content of p-formyl benzoic acid methyl ester in the dimethyl terephthalate was reduced as shown in Table 1 below.

TABLE 1

| | Treatment duration, minutes | | | | | |
|---|---|---|---|---|---|---|
| | 0 | 5 | 10 | 20 | 30 | 60 |
| Content of MTA,[1] percent | 0.08 | 0.02 | 0.004 | 0.003 | 0.002 | <0.002 |

[1] p-Formyl benzoic acid methyl ester.

350 g. of dimethyl terephthalate produced by the oxidizing treatment were placed in a glass distillation column having a 20 mm. inner diameter and a 1200 mm. height. The distillation was performed for 3 hours and under a pressure of 40 to 50 mm. Hg. The temperature inside the column was 180° C.–200° C.; while at the top of the column it was 180° C.–190° C.

The purified dimethyl terephthalate thus obtained showed, when heated for 4 hours at 175° C., 10 APHA color in the molten state.

The process of this example was repeated, however 0.4 g. of cobalt acetate was employed instead of potassium bromide. The p-formyl benzoic acid methyl ester (MTA) content of the resultant crude dimethyl terephthalates varied as shown in Table 2 below.

TABLE 2

| | Treatment duration, minutes | | | |
|---|---|---|---|---|
| | 0 | 10 | 30 | 60 |
| MTA content, percent | 0.08 | 0.08 | 0.08 | 0.07 |

EXAMPLE 3

The process of Example 1 was followed for the esterification. However, cobalt acetate was employed at the rate 23.4 g./hr. The resultant crude dimethyl terephthalate contained 0.10 wt. percent of p-formyl benzoic acid methyl ester. 400 g. of this crude dimethyl terephthalate were placed in a glass flask and melted in an oil bath at 200° C. over a period of 30 minutes.

The resultant molten crude dimethyl terephthalate was poured into a reaction column having a 47 mm. diameter and a 500 mm. height. 0.2 g. of cobalt acetate and 0.23 g. of sodium bromide were then added to said column. Oxidizing gases were then blown into the column under the same condition as described in Example 2.

In the course of the purification the p-formyl benzoic acid methyl ester (MTA) content of the dimethyl terephthalate was reduced as shown in Table 3, below.

TABLE 3

| | Treatment duration, minutes | | | | | |
|---|---|---|---|---|---|---|
| | 0 | 5 | 10 | 20 | 30 | 60 |
| MTA content, percent | 0.10 | 0.03 | 0.004 | 0.003 | 0.002 | <0.002 |

The reaction product was distilled to obtain a purified dimethyl terephthalate. The purified dimethyl terephthalate showed, when heated for 4 hours at 175° C., 10 APHA color in the molten state.

EXAMPLE 4

A crude dimethyl terephthalate containing 0.08 wt. percent of p-formyl benzoic acid methyl ester was obtained by the process described in Example 1; however, cobalt acetate was not used in the esterification. 400 g. of the crude dimethyl terephthalate were placed in a glass flask and melted in an oil bath at 200° C. for 30 minutes.

The resultant product was poured into a reaction column having a 47 mm. diameter and a 500 m. height. 0.4 g. of cobalt acetate were added to said column. Oxidizing gases generally composed of 95 mol percent of nitrogen and 5 mol percent of oxygen but containing 0.2 mol percent of tetrabromoethane by volume were blown into the bottom of the column at the rate 120-liter NTP/hr. This treatment was carried out for 2 hours at 200° C.

During the treatment, the content of p-formyl benzoic acid methyl ester (MTA) in the dimethyl terephthalate was gradually reduced as shown in Table 4 below:

TABLE 4

| | Treatment duration, minutes | | | |
|---|---|---|---|---|
| | 0 | 10 | 20 | 30 | 60 |
| MTA content, percent | 0.08 | 0.025 | 0.01 | 0.005 | <0.002 |

The reaction product was distilled. The purified dimethyl terephthalate thus obtained showed, when subjected to 4 hours of heating at 175° C., 15 APHA color in the molten state.

EXAMPLE 5

A crude dimethyl terephthalate containing 0.10 wt. percent of p-formyl benzoic acid methyl ester was produced by the process of esterification described in Example 1. However, cobalt chloride instead of cobalt acetate was supplied to the reaction system at the rate 37.4 g./hr. 400 g. of said crude dimethyl terephthalate were poured into a reaction column which was as described in Example 2. 0.27 g. of potassium bromide were added to said column. Oxidizing gases were then blown into the column as described in Example 2.

The content of p-formyl benzoic acid methyl ester (MTA) of the dimethyl terephthalate was reduced as shown in Table 5, below.

TABLE 5

| | Treatment duration, minutes | | | | | |
|---|---|---|---|---|---|---|
| | 0 | 5 | 10 | 20 | 30 | 60 |
| MTA content, percent | 0.10 | 0.04 | 0.01 | 0.005 | 0.002 | <0.002 |

EXAMPLE 6

The process of Example 2 was followed for the purification of a crude dimethyl terephthalate. However, 0.27 g. of cobalt bromide instead of cobalt acetate and potassium bromide were employed. The content of p-formyl benzoic acid methyl ester (MTA) in the dimethyl terephthalate was reduced as shown in Table 6, below.

TABLE 6

| | Treatment duration, minutes | | | | | |
|---|---|---|---|---|---|---|
| | 0 | 5 | 10 | 20 | 30 | 60 |
| MTA content, percent | 0.08 | 0.02 | 0.004 | 0.003 | 0.002 | <0.002 |

The reaction product was distilled. The purified dimethyl terephthalate thus obtained showed, when heated for 4 hours at 175° C., 15 APHA color in the molten state.

EXAMPLE 7

2 kg. of a crude terephthalic acid obtained by the oxidation of p-xylene and 7 kg. of methanol were reacted in a 10-liter autoclave for 3 hours at 280° C. and stirring. Upon completion of the reaction, the reaction product was cooled to room temperature and withdrawn from the autoclave. The resulting slurry was stripped of unreacted methanol and formed water and again charged along with 7 kg. of methanol into the autoclave and reacted for 3 hours at 280° C.

The resultant reaction liquor was distilled to remove lower boiling substances as for example methanol and water. The resultant crude dimethyl terephthalate was 97.5% pure and contained 0.08% p-formyl benzoic acid methyl ester.

400 g. of this dimethyl terephthalate were subjected to the oxidizing purification described in Example 2; however, 0.7 g. of cobalt benzoate were employed in place of 0.4 g. of cobalt acetate. The content of p-formyl benzoic acid methyl ester (MTA) in the purified dimethyl terephthalate was reduced as shown in Table 7, below.

TABLE 7

| | Treatment duration, minutes | | | | | |
|---|---|---|---|---|---|---|
| | 0 | 5 | 10 | 20 | 30 | 60 |
| MTA content, percent | 0.08 | 0.02 | 0.004 | 0.003 | 0.002 | <0.002 |

The reaction product was distilled. The purified dimethyl terephthalate thus obtained showed, when heated for 4 hours at 175° C., 10 APHA color in the molten state.

EXAMPLE 8

The purification of a crude dimethyl terephthalate was carried out by the process described in Example 5; however, instead of cobalt chloride, cobalt carbonate was supplied at the rate 26.9 g./hr. In the course of the purification the content of p-formyl benzoic acid methyl ester (MTA) in the dimethyl terephthalate was reduced as shown in Table 8, below.

TABLE 8

| | Treatment duration, minutes | | | | | |
|---|---|---|---|---|---|---|
| | 0 | 5 | 10 | 20 | 30 | 60 |
| MTA content, percent | 0.10 | 0.03 | 0.004 | 0.003 | 0.002 | <0.002 |

The reaction product was distilled. The purified dimethyl terephthalate thus obtained showed, when heated for 4 hours at 175° C., 15 APHA color in the molten state.

EXAMPLE 9

2 kg. of a crude terephthalic acid produced by the oxidation of p-xylene, 7 kg. of methanol and 1 g. of cobalt oxide were charged into a 10-liter autoclave. The mixture was stirred and reacted at 280° C. for 3 hours. Upon completion of the reaction, the resultant slurry was cooled to room temperature and withdrawn.

Unreacted methanol and formed water were separated from the slurry 7 kg. of methanol were added to the slurry and the mixture was again reacted in the autoclave at 280° C. for 3 hours.

The resultant crude dimethyl terephthalate was 97.5% pure and contained 0.08% of p-formyl benzoic acid methyl ester (MTA).

400 g. of this crude dimethyl terephthalate were subjected to the oxidizing purification described in Example 2. However, since the dimethyl terephthalate already contained a cobalt compound; 0.27 g. of potassium bromide was used.

During the reaction, the content of p-formyl benzoic acid methyl ester (MTA) in the dimethyl terephthalate was reduced as shown in Table 9, below.

TABLE 9

| | Treatment duration, minutes | | | | | |
|---|---|---|---|---|---|---|
| | 0 | 5 | 10 | 20 | 30 | 60 |
| MTA content, percent | 0.08 | 0.04 | 0.02 | 0.009 | 0.004 | <0.002 |

The reaction product was distilled. The purified dimethyl terephthalate thus obtained showed, when heated for 4 hours at 175° C., 15 APHA color in the molten state.

EXAMPLE 10

The purification of a crude dimethyl terephthalate containing 0.15 wt. percent of p-formyl benzoic acid methyl ester was carried out by the process described in Example 2. However, 0.042 g. of benzene hexabromide comprising a mixture of the $\alpha$-, $\beta$-, $\gamma$- and $\delta$-types of benzene hexabromide was used in place of the potassium bromide.

In the course of the purification the content of p-formyl benzoic acid methyl ester (MTA) in the dimethyl terephthalate was reduced as shown in Table 10, below.

TABLE 10

| | Treatment duration, minutes | | | | | |
|---|---|---|---|---|---|---|
| | 0 | 5 | 10 | 20 | 30 | 60 |
| MTA content, percent | 0.15 | 0.087 | 0.006 | <0.002 | <0.002 | <0.002 |

The reaction product was distilled. The purified dimethyl terephthalate thus obtained showed, when heated for 4 hours at 175° C., 15 APHA color in the molten state.

EXAMPLE 11

The process of esterification of a crude terephthalic acid described in Example 1 was followed. However, instead of cobalt acetate, zinc oxide was fed to the column at the rate 45 kg./hr. Upon completion of the esterification, the crude dimethyl terephthalate was withdrawn from a reduced pressure-deairation column. The crude dimethyl terephthalate was transferred to a distillation column and distilled off the top of said column.

The resultant crude dimethyl terephthalate contained only 0.08 wt. percent of p-formyl benzoic acid methyl ester (MTA) and no higher boiling substances. The crude dimethyl terephthalate was introduced into an oxidizing purification tank at the rate 35 kg./hr. The tank was provided with a stirrer.

A suspension liquor was produced by heating and mixing a catalyst comprised of 2.5 kg. of cobalt acetate and 2.5 kg. of manganese tetrahydrobromide together with 95 kg. of dimethyl terephthalate, in a nitrogen atmosphere. The suspension liquor was fed to the oxidizing purification tank at the rate 1.4 kg./hr. Purified dimethyl terephthalate was produced at the rate 30 kg./hr.

This purified dimethyl terephthalate contained less than 0.002 wt. percent of p-formyl benzoic acid methyl ester and showed, when heated for 4 hours at 175° C., 10 APHA color in the molten state.

EXAMPLE 12

Dimethyl terephthalate containing 0.15 wt. percent of p-formyl benzoic acid methyl ester was produced by the process of esterification described in Example 1, excepting that no cobalt acetate was employed. 400 g. of said dimethyl terephthalate were placed in a glass flask and melted in an oil bath at 200° C. for 30 minutes.

The reaction product was poured into a reaction column having a 47 mm. diameter and a 500 mm. height. 0.4 g. of cobalt acetate, 0.4 g. of manganese acetate and 0.27 g. of potassium bromide were added to said column. Oxidizing gases comprised of 95 mol percent of nitrogen and 5 mol percent of oxygen were blown into the bottom of said column at the rate 120-liter NTP/hr. The treatment was carried out for 60 minutes at 200° C. In the course of the treatment, the content of p-formyl benzoic acid methyl ester (MTA) in the dimethyl terephthalate was reduced as shown in Table 11, below.

TABLE 11

| | Treatment duration, minutes | | | | | |
|---|---|---|---|---|---|---|
| | 0 | 5 | 10 | 20 | 30 | 60 |
| MTA content, percent | 0.15 | 0.025 | 0.004 | <0.002 | <0.002 | <0.00 |

The reaction product was distilled. The purified dimethyl terephthalate thus obtained showed, when heated for 4 hours at 175° C., 10 APHA color in the molten state.

EXAMPLE 13

2 kg. of a crude terephthalic acid obtained by the oxidation of p-xylene, 7 kg. of methanol, and 2.4 g. of cobalt acetate were charged into a 10-liter autoclave. The reaction was carried out at 280° C. for 3 hours under stirring. When its temperature dropped to room temperature, the reaction product was withdrawn from the autoclave. The slurry thus obtained was stripped of unreacted methanol and formed water and once again subjected to the reaction with methanol in the autoclave. This second reaction was carried out at 280° C. for 3 hours. The resulting crude dimethyl terephthalate was found to contain 0.12% of p-formyl benzoic acid methyl ester (MTA), and to be 97.5% pure.

400 g. of this dimethyl terepthalate were placed in a glass flask and melted in an oil bath at 200° C., for 30 minutes. The resultant molten dimethyl terephthalate was poured into a reaction column having a 47 mm. diameter and a 500 mm. height. 0.27 g. of potassium bromide and 0.4 g. manganese acetate were then added to said column. Oxidizing gases composed of 95 vol. percent of nitrogen and 5 vol. percent of oxygen were blown into the bottom of said column at the rate 120-liter NTP/hr. This treatment was carried out for 20 minutes at 200° C. The reaction product was distilled. The purified dimethyl terephthalate thus obtained contained only 0.002% of p-formyl benzoic acid methyl ester (MTA) and showed when heated for 4 hours at 175° C. 10 APHA color in the molten state.

EXAMPLE 14

A crude dimethyl terephthalte containing 0.08 wt. percent of p-formyl benzoic acid methyl ester was obtained by the esterification described in Example 7. 400 g. of this crude dimethyl terephthalate were placed in a glass flask and melted in an oil bath at 200° C. for 30 minutes. The resultant product was poured into a reaction column which was as described in Example 2. 0.4 g. of cobalt acetate, 0.2 g. of manganese acetate and 0.27 g. of potassium bromide were added to said column. The oxidizing gases, of Example 2, were blown into the bottom of the column at the rate 10-liter NTP/hr. The treatment was carried out for 20 minutes at 200° C. The reaction product was then distilled. The purified dimethyl terephthalate thus obtained contained only 0.002% of p-formyl benzoic acid methyl ester and showed, when heated for 4 hours at 175° C., 10 APHA color in the molten state.

EXAMPLE 15

The process of Example 1 was followed for the esterification reaction. However, the terephthalic acid obtained by the oxidation of p-xylene and the methyl alcohol were supplied to a raw material adjustment tank at the rate 40 kg./hr. and 78 kg./hr., respectively. The resultant crude dimethyl terephthalic acid contained 0.10 wt. percent of p-formyl benzoic acid methyl ester. 400 g. of this dimethyl terephthalate were poured into the reaction column of Example 2. 0.3 g. of $Co(AcO)_2$, 0.08 g. of $Mn(AcO)_2$, and 0.2 g. of NaBr were added to said column. Oxidizing gases comprised of 95 vol. percent nitrogen and 5 vol. percent oxygen were blown into the bottom of the column at the rate 120-liter NTP/hr. This treatment was carried out for 60 minutes at 200° C.

In the course of the treatment, the content of p-formyl benzoic acid methyl ester (MTA) in the said dimethyl terephthalate was reduced as shown in Table 12, below.

TABLE 12

| | Treatment duration, minutes | | | | | |
|---|---|---|---|---|---|---|
| | 0 | 5 | 10 | 20 | 30 | 60 |
| MTA content, percent | 0.10 | 0.03 | 0.004 | <0.002 | <0.002 | <0.002 |

The reaction product was distilled. The purified dimethyl terephthalate thus formed showed, when heated for 4 hours at 175° C., 10 APH color in the molten state.

We claim:

1. A process for the purification of a crude dimethyl terephthalate produced by esterifying with methanol a terephthalic acid obtained by oxidizing p-xylene with an oxygen-containing gas which comprises the steps of contacting the crude dimethyl terephthalate with molecular oxygen in the presence of a catalyst comprising (1) 0.002% to 1.0% by weight, calculated as metallic cobalt, of a member selected from a first group consisting of metallic cobalt, a cobalt oxide, a cobalt salt of an acid, and (2) 0.001%–1.0% by weight, calculated as bromine, of a member selected from a second group consisting of sodium bromide, potassium bromide, ammonium bromide, sodium bromate, tetrabromoethane, methyl bromide, bromoform, manganese bromide and benzene hexabromide, each of said members being soluble in the crude dimethyl terephthalate, thereby producing a purified dimethyl terephthalate.

2. A process as in claim 1 wherein the cobalt salt of an acid is cobalt acetate, cobalt benzoate, cobalt toluate, cobalt terephthalate, cobalt oxalate, cobalt carbonate, basic cobalt carbonate, cobalt chloride or cobalt bromide.

3. A process as in claim 1 wherein the cobalt salt is cobalt acetate.

4. A process as in claim 1 wherein said member from said second group is sodium bromide.

5. A process as in claim 1 wherein said member from said second group is potassium bromide.

6. A process as in claim 1, further including the step of distilling the purified dimethyl terephthalate to remove lower and higher boiling materials therefrom.

7. A process as in claim 1, wherein the material having available cobalt is introduced during the terephthalic acid esterification.

8. A process as in claim 1, wherein the member of the first group is first introduced during the step of contacting the crude dimethyl terephthalate with molecular oxygen.

9. A process as in claim 1, wherein the member of the second group is introduced during the terephthalic acid esterification.

10. A process as in claim 1, wherein the member of the second group is first introduced during the step of contacting the crude dimethyl terephthalate with molecular oxygen.

11. A process as in claim 1 wherein the contacting is also carried out in the presence of 0.001%–0.1% by weight, calculated as metallic manganese, of a second catalyst comprising at least one member selected from a third group consisting of metallic manganese, an oxide of manganese and a manganese salt of an acid, said member of the third group being soluble in the crude dimethyl terephthalate.

12. A process as in claim 11 wherein the manganese salt is the manganese bromide, manganese chloride, manganese carbonate, manganese nitrate, manganese acetate, manganese oxalate, manganese benzoate or manganese 2-ethyl hexanoate and the oxide of manganese is manganese dioxide.

13. A process as in claim 11 wherein the manganese salt is manganese acetate.

14. A process as in claim 11 wherein the crude dimethyl terephthalate is contacted with molecular oxygen at a temperature of 140° C.–280° C., said member of the first group is cobalt acetate, cobalt benzoate, cobalt toluate, cobalt carbonate, basic cobalt carbonate, cobalt chloride, or cobalt bromide, and said member of the first group and said member of the second group and said member of the third group are each first employed in the step of contacting the crude dimethyl terephthalate with molecular oxygen.

15. A process as in claim 11, wherein the member of the third group is introduced during the terephthalic acid esterification.

16. A process as in claim 11, wherein the member of the third group is first introduced during the step of contacting the crude dimethyl terephthalate with molecular oxygen.

17. A process for the purification of a crude dimethyl terephthalate produced by esterifying with methanol a terephthalic acid obtained by oxidizing p-xylene with an oxygen-containing gas which comprises the steps of contacting the crude dimethyl terephthalate with molecular oxygen in the presence of a catalyst comprising (1) 0.002% to 1.0% by weight, calculated as metallic cobalt, of a member selected from a first group consisting of metallic cobalt, a cobalt oxide, cobalt acetate, cobalt benzoate, cobalt toluate, cobalt terephthalate, cobalt oxalate, cobalt carbonate, basic cobalt carbonate, cobalt chloride, and cobalt bromide and (2) 0.001% to 1.0% by weight, calculated as bromine, of a member selected from a second group consisting of sodium bromide, potassium bromide, tetrabromoethane, cobalt bromide, benzene hexabromide, and manganese-tetrahydrobromide, each of said members being soluble in the crude dimethyl terephthalate, thereby producing a purified dimethyl terephthalate.

References Cited

UNITED STATES PATENTS

| 2,833,816 | 5/1958 | Safeer et al. | 260—524 |
| 2,894,978 | 7/1959 | Katzschmann | 260—475 |
| 3,004,062 | 10/1961 | Kreps | 260—475 |
| 3,010,991 | 11/1961 | Meyer | 260—475 |
| 3,053,883 | 9/1962 | Dean et al. | 260—475 |
| 3,251,878 | 5/1966 | Pasky | 260—537 |
| 3,354,202 | 11/1967 | Zimmerschied et al. | 260—524 |
| 3,387,027 | 6/1968 | Alagy | 260—524 |

FOREIGN PATENTS

| 281,587 | 3/1965 | Australia | 260—475 |

CHARLES B. PARKER, Primary Examiner

E. J. SKELLY, Assistant Examiner